United States Patent
Zhao et al.

(10) Patent No.: US 10,264,189 B2
(45) Date of Patent: Apr. 16, 2019

(54) IMAGE CAPTURING SYSTEM AND METHOD OF UNMANNED AERIAL VEHICLE

(71) Applicant: ZEROTECH (Shenzhen) Intelligence Robot Co., Ltd., Shenzhen (CN)

(72) Inventors: Guo-Dong Zhao, Beijing (CN); Yu-Cheng Liang, Beijing (CN); Jian-Jun Yang, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 180 days.

(21) Appl. No.: 15/394,607

(22) Filed: Dec. 29, 2016

(65) Prior Publication Data
US 2018/0115721 A1    Apr. 26, 2018

(30) Foreign Application Priority Data

Dec. 31, 2015   (CN) .......................... 2015 1 1021419

(51) Int. Cl.
| | | |
|---|---|---|
| *H04N 5/232* | (2006.01) | |
| *B64C 39/02* | (2006.01) | |
| *B64D 47/08* | (2006.01) | |
| *G05D 1/00* | (2006.01) | |

(52) U.S. Cl.
CPC ....... *H04N 5/23296* (2013.01); *B64C 39/024* (2013.01); *B64D 47/08* (2013.01); *G05D 1/0038* (2013.01); *H04N 5/232* (2013.01); *H04N 5/23203* (2013.01); *H04N 5/23212* (2013.01); *B64C 2201/027* (2013.01); *B64C 2201/127* (2013.01); *B64C 2201/146* (2013.01)

(58) Field of Classification Search
CPC ........... H04N 5/23296; H04N 5/23203; H04N 5/23212; B64C 39/024; B64C 2201/127; B64C 2201/146; G05D 1/0038
See application file for complete search history.

(56) References Cited

U.S. PATENT DOCUMENTS

| | | | | | |
|---|---|---|---|---|---|
| 5,416,513 | A | * | 5/1995 | Morisaki | G01S 3/7864 348/157 |
| 8,649,917 | B1 | * | 2/2014 | Abernathy | G01S 17/88 348/140 |
| 8,924,044 | B1 | * | 12/2014 | Wang | G05D 1/0022 340/961 |

(Continued)

*Primary Examiner* — Nhon T Diep

(57) ABSTRACT

An image capturing system of an unmanned aerial vehicle is disclosed. The image capturing system includes a camera; a platform carrying the camera; and a platform controller configured to adjust a rotating speed of the camera through the platform based on a rotating instruction information and a current zoom magnification of the camera. The current zoom magnification is substantially real-time obtained from the camera. An image capturing method of an unmanned aerial vehicle is also disclosed. In the method a first instruction information and a rotating instruction information are received. A camera is zoomed based on the first instruction information. A current zoom magnification of the camera is obtained. A rotating speed of the camera is adjusted through a platform based on the rotating instruction information and the current zoom magnification.

18 Claims, 3 Drawing Sheets

(56) References Cited

U.S. PATENT DOCUMENTS

| | | | |
|---|---|---|---|
| 2007/0286456 A1* | 12/2007 | Ariyur | G06K 9/32 382/103 |
| 2008/0079932 A1* | 4/2008 | Yokota | G01N 21/9503 356/237.1 |
| 2010/0097460 A1* | 4/2010 | Abernathy | G01C 11/00 348/140 |
| 2014/0340427 A1* | 11/2014 | Baker | G06T 3/0062 345/641 |
| 2015/0229841 A1* | 8/2015 | Zhou | G01S 3/7864 348/37 |
| 2016/0327950 A1* | 11/2016 | Bachrach | G05D 1/0016 |

* cited by examiner

US 10,264,189 B2

IMAGE CAPTURING SYSTEM AND METHOD OF UNMANNED AERIAL VEHICLE

CROSS-REFERENCE TO RELATED APPLICATIONS

This application claims all benefits accruing under 35 U.S.C. § 119 from Chinese Patent Application No. 201511021419.6, filed on Dec. 31, 2015, in the State Intellectual Property Office of China, the content of which is hereby incorporated by reference.

FIELD

The present disclosure relates to aircraft control systems and methods, and particularly relates to image capturing system and method of unmanned aerial vehicle.

BACKGROUND

An unmanned aerial vehicle (UAV), commonly known as a drone, is an aircraft without a human pilot aboard. Small sized UAVs are increasingly used in various fields such as aerial photography, surveillance, scientific research, geological survey, and remote sensing. A camera may be equipped on the UAV through a platform system to implement a shooting task. In flight, real time images or video data captured by the camera can be real-time streamed back to a remote monitoring device on the ground through a wireless communication. A relative motion may be existed between the UAV and a target subject to be captured. To track the subject and obtain a clear and stabilized image, user may need to adjust an angle and a focus of the camera in real time through a remote controller based on the live images captured by the camera and displayed on the monitoring device.

BRIEF DESCRIPTION OF THE DRAWINGS

Implementations are described by way of example only with reference to the attached figures.

DETAILED DESCRIPTION

Figure 1:
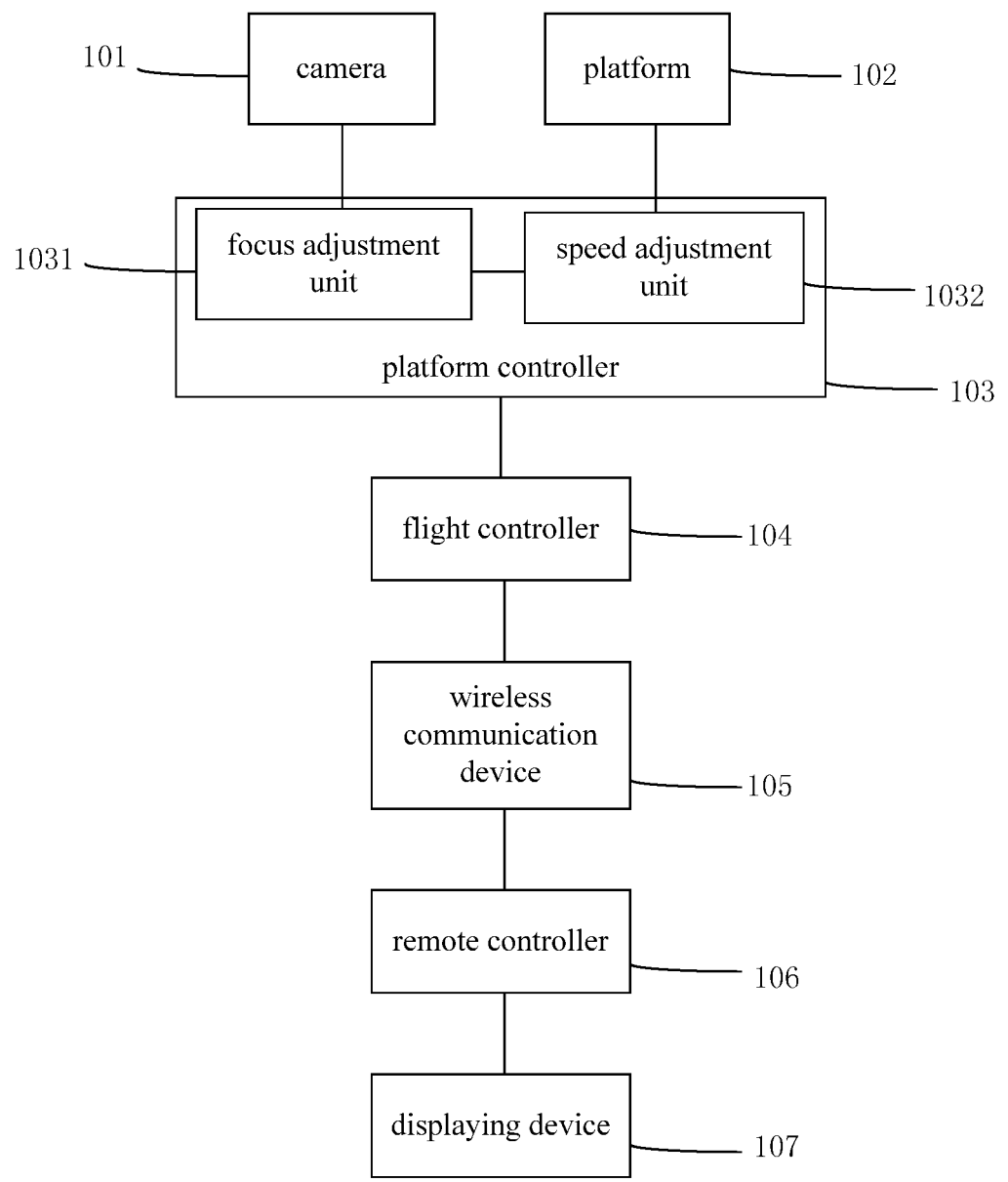
FIG. 1 is a block diagram of one embodiment of an image capturing system of a UAV.
Figure 2:
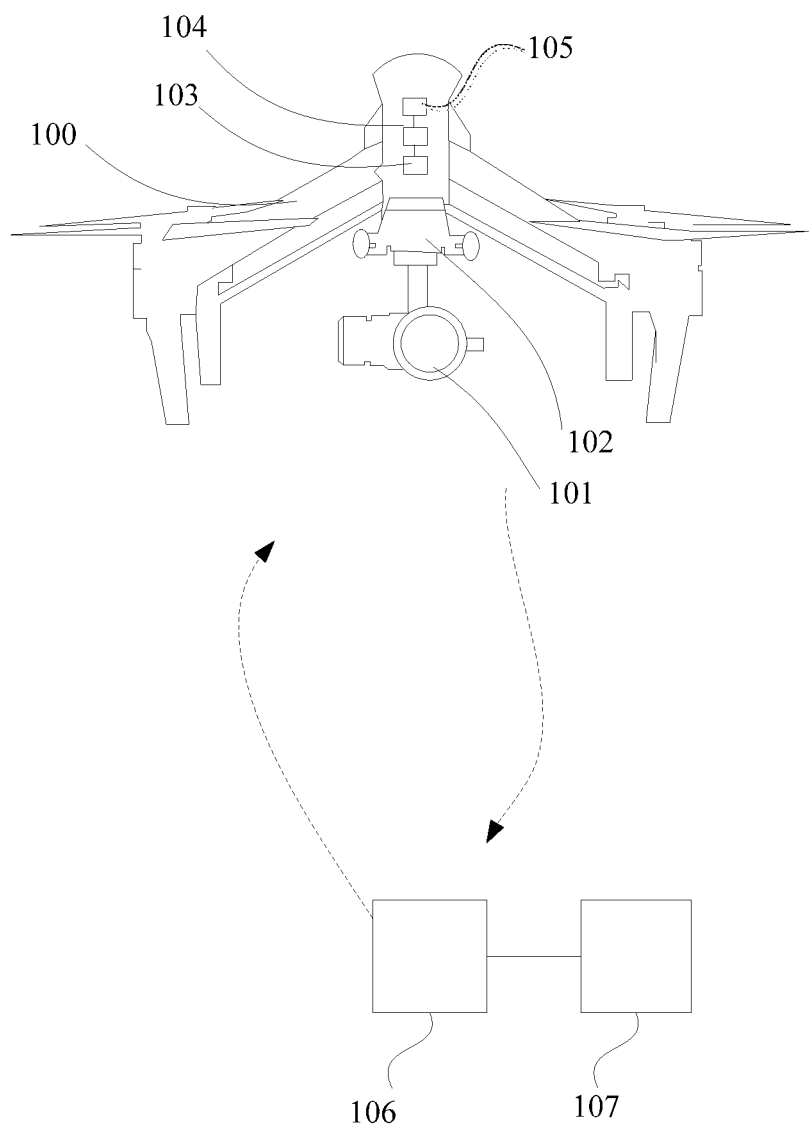
FIG. 2 is a schematic view of a communication between the UAV and controlling and monitoring devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the present disclosure, the terms "vertical" and "horizontal" are directions with respect to a main body of a UAV. The term "information" in the present disclosure can be in forms of electrical signals (e.g., digital signals and/or analog signals), electromagnetic wave signals, and/or optical signals.

Referring to FIG. 1, one embodiment of an image capturing system of an unmanned aerial vehicle (UAV) 100 comprises a camera 101, a platform 102, and a platform controller 103. The UAV 100 can comprise a main body, such as a fuselage. The platform 102 and the platform controller 103 can be mounted on the main body. The camera 101 can be mounted on the platform 102.

The camera 101 is configured to capture images such as photos and/or videos. The camera 101 can be electrically connected to the platform controller 103, and controlled, by the platform controller 103 in one embodiment, to perform a zooming action such as a zoom in or a zoom out action to change a zoom magnification and focus on a target subject. In another embodiment, the camera 101 can be controlled by an independent device separated from the platform controller 103.

The platform 102 is configured to carry and rotate (e.g., to change an orientation of) the camera 101. In one embodiment, the platform 102 is configured to rotate the camera 101 relative to the main body of the UAV 100. In another embodiment, the platform 102 is configured to rotate the camera 101 relative to a portion of the UAV 100 regardless of the movement of the other portion of the UAV 100. The platform 102 can comprise at least one rotational axis (e.g., one, two, or three rotational axis) and at least one rotational arm (e.g., one, two, or three rotational arms) that is configured to rotate about the at least one rotational axis in a one-to-one manner. The camera 101 is rotated substantially synchronously with the platform 102 (e.g., with the at least one rotating arm), thereby being capable of rotating about the at least one rotational axis. The rotational axis can be a yaw axis, a roll axis, and/or a pitch axis. In one embodiment, the camera 101 can be rotated in a horizontal plane with respect to the main body of the UAV 100 (i.e., rotated about the yaw axis), and/or rotated in a vertical plane with respect to the main body of the UAV 100 (i.e., rotated about the pitch axis). The platform 102 can be a gimbal or a gimbal assembly.

The platform controller 103 is configured to control and adjust the platform 102 based on an information substantially real-time obtained from the camera 101. The information can comprise or represent a current zoom magnification that is substantially real-time obtained from the camera. The zoom magnification can be an optical zoom magnification and/or a digital zoom magnification, of the camera 101. A rotating speed of the camera 101 can be controlled and adjusted through the platform 102 based on the current zoom magnification substantially in real-time obtained from the camera 101. The rotating speed of the camera 101 can be changed based on the current zoom magnification of the camera 101. The platform controller 103 can also be configured to control the camera 101 to perform the zooming action, and receive the current zoom magnification of the camera 101.

The platform controller 103 can comprise a focus adjustment unit 1031 to zoom the camera 101 and a speed adjustment unit 1032 to control the platform 102, thereby controlling the rotating speed of the camera 101.

The focus adjustment unit 1031 can be electrically connected to the camera 101, and capable of controlling the camera 101 to perform the zooming action based on a first instruction information. The first instruction information is configured to zoom the camera 101 to a target zoom magnification. The first instruction information can be received from a remote controller 106 through a wireless communication between the UAV 100 and the remote controller 106. During the zooming adjustment, the focus adjustment unit 1031 is also capable of obtaining a real-time zooming information, such as the current zoom magnification, from the camera 101.

The speed adjustment unit 1032 can be respectively and electrically connected to the focus adjustment unit 1031 and the platform 102, and capable of adjusting the rotating speed of the camera 101 by controlling the rotating speed of the at least one rotational axis of the platform 102. The adjustment of the rotating speed of the camera 101 is based on the current zoom magnification of the camera 101 and a rotating instruction information. The rotating instruction information can comprise at least one of a second instruction information and a third instruction information. The second instruction information is configured to adjust a rotating speed of the camera 101 about a first rotational axis, such as a yawing speed (i.e., the rotating speed about a yaw axis) or a rotating speed in a horizontal plane. The third instruction information is configured to adjust a rotating speed of the camera 101 about a second rotational axis, such as a pitching speed (i.e., the rotating speed about a pitch axis) or a rotating speed in a vertical plane. The rotating instruction information can be received from the remote controller 106 through the wireless communication between the UAV 100 and the remote controller 106.

The real-time obtained current zoom magnification can be stored in the focus adjustment unit 1031 real timely during the zooming adjustment. The speed adjustment unit 1032 can obtain the current zoom magnification stored in the focus adjustment unit 1031 during the adjusting of the platform 102.

The platform controller 103 is configured to adjust the rotating speed of the camera 101 through the platform 102 based on the substantially real-time obtained current zoom magnification of the camera 101. In one embodiment, the rotating speed of the camera 101 is adjusted to be inversely proportional to the current zoom magnification of the camera 101. Thereby, the rotating speed decreases with the increasing of the current zoom magnification.

The image capturing system can further comprise a flight controller 104 and a wireless communication device 105 mounted on the main body of the UAV 100. The flight controller 104 can be electrically connected to the wireless communication device 105 to receive the first instruction information and the rotating instruction information from the remote controller 106, and can be electrically connected to the platform controller 103 to transmit the first instruction information and the rotating instruction information to the platform controller 103. The focus adjustment unit 1031 can be electrically connected to the flight controller 104 to receive the first instruction information transmitted from the flight controller 104. The speed adjustment unit 1032 can be electrically connected to the flight controller 104 to receive the rotating instruction information transmitted from the flight controller 104.

The image capturing system can further comprise the remote controller 106 and the displaying device 107 connected to the remote controller 106. The displaying device 107 can be mounted on the remote controller 106 or separated from the remote controller 106. The remote controller 106 is configured to communicate with the flight controller 104 through the wireless communication device 105 and transmitting the image data signals obtained substantially in real time by the camera 101 to the displaying device 107. Thereby, the images captured by the camera 101 can be substantially real-time displayed by the displaying device 107.

In one embodiment, the image data signals obtained by the camera 101 can be transmitted to the platform controller 103 and/or the flight controller 104. The platform controller 103 and/or the flight controller 104 can then transmit the image data signals to the wireless communication device 105. The wireless communication device 105 can then transmit the image data signals to a wireless communication module comprised by the remote controller 106 through the wireless communication therebetween. The displaying device 107 can receive the image data signals from the remote controller 106 and convert the image data signals into displayed images.

By monitoring the displaying device 107, the user can determine a moving direction of the target subject, and input the rotating instruction information and the first instruction information to the remote controller 106 to track and focus on the target subject. The remote controller 106 is capable of sending the first instruction information to zoom the camera 101 and the rotating instruction information according to the moving direction of the target subject to the flight controller 104. The remote controller 106 can comprise a wireless communication module to transmit the first, second, and/or third instruction information to the UAV 100. In one embodiment, the remote controller 106 transmits the first, second, and/or third instruction information to the wireless communication device 105. The flight controller 104 receives the first, second, and/or third instruction information from the wireless communication device 105, transmits the first instruction information to the focus adjustment unit 1031 of the platform controller 103, and transmits the second and/or third instruction information to the speed adjustment unit 1032 of the platform controller 104.

The first, second, and/or third instruction information can be generated in the remote controller 106 according to user's inputs. In one embodiment, the remote controller 106 comprises three channels for respectively receiving user's inputs to generate the first, second, and third instruction information to control and/or adjust the zoom magnification of the camera 101, the rotating speed about the first rotational axis in the horizontal plan (e.g., the yawing speed) of the camera 101, and the rotating speed about the second rotational axis in the vertical plane (e.g., the pitching speed) of the camera 101.

In the remote controller 106, the channel for receiving user's input to generate the first instruction information can have a first parameter corresponding to control and/or adjust the zoom magnification of the camera 101. The first parameter can be adjusted according to the user's input in a range between a first parameter maximum value and a first parameter minimum value. The first parameter shifting value (n1) is a difference between the first parameter maximum value and the first parameter minimum value. The first instruction information contains a first parameter target value (m1) input by user, which is in the range between the first parameter maximum value and the first parameter minimum value.

The channel in the remote controller 106 for receiving the user's input to generate the second instruction information can have a second parameter corresponding to control and/or adjust the rotating speed about the first rotational axis of the camera 101. The second parameter can be adjusted according to the user's input in a range between a second parameter maximum value and a second parameter minimum value. The second parameter shifting value (n2) is a difference between the second parameter maximum value and the second parameter minimum value. The second instruction information contains a second parameter target value (nc) input by the user, which is in the range between the second parameter maximum value and a second parameter minimum value.

The channel in the remote controller 106 for receiving the user's input to generate the third instruction information can have a third parameter corresponding to control and/or adjust the rotating speed about the second rotational axis of the camera 101. The third parameter can be adjusted according to the user's input in a range between a third parameter maximum value and a third parameter minimum value. The third parameter shifting value (n3) is a difference between the third parameter maximum value and the third parameter minimum value. The third instruction information contains a third parameter target value (mc) input by the user, which is in the range between the third parameter maximum value and the third parameter minimum value.

The first, second, and third parameter shifting values (n1, n2, n3) can be fixed values set by the remote controller 106. The first, second, and third parameter target values (m1, nc, mc) are input by the user.

In one embodiment, the platform controller 103 is configured to previously obtain a first parameter shifting value (n1), and at least one of a second parameter shifting value (n2) and a third parameter shifting value (n3), from the remote controller 106. The platform controller 103 can also be configured to previously obtain a preset zoom magnification (w), which is a maximum zoom magnification that the camera 101 can have. The platform 103 can also be configured to previously obtain a maximum rotating speed (v1) about the first rotational axis that the platform 102 can reach, and a maximum rotating speed (v3) about the second rotational axis that the platform 102 can reach.

By receiving the first instruction information, the focus adjustment unit 1031 can control the camera 101 to perform the zooming action according to a calculating formula (1):

$$x=(m1/n1)\times w,$$

wherein x is the target zoom magnification after the zooming action. During the zooming adjustment to reach the target zoom magnification (x), the camera 101 constantly captures images, which are substantially real-time streamed back to the displaying device 107, and the focus adjustment unit 1031 constantly obtain the real-time zoom magnification (×1) from the camera 101.

By monitoring the displaying device 107, the user can determine a moving direction of the target subject with respect to the camera 101, and input the rotating instruction information to track the target subject.

By receiving the second instruction information and the real-time zoom magnification of the camera 101, the speed adjustment unit 1032 can control the platform 102 to adjust the rotating speed of the camera 101 about the first rotational axis according to a calculating formula (2):

$$v2=v1\times(1/\times1)\times q,$$

wherein q=nc/n2, v2 is a target rotating speed of the camera 101 about the first rotational axis, ×1 is the current zoom magnification which is varied constantly until it reaches the target zoom magnification (x), and ×1<x. The second parameter target value (nc) input by the user can be a positive number or a negative number. When nc>0, and thereby q>0, the camera 101 can be controlled to rotate clockwise in the horizontal plane about the first rotational axis. When nc=0, the camera 101 can be held still in the vertical plane. When nc<0, and thereby q<0, the camera 101 can be controlled to rotate counterclockwise in the horizontal plane about the first rotational axis. In another embodiment, q=(nc−ni)/n2, wherein ni is ½ of the second parameter maximum value.

By receiving the third instruction information and the real-time zoom magnification of the camera 101, the speed adjustment unit 1032 can control the platform 102 to adjust the rotating speed of the camera 101 about the second rotational axis according to a calculating formula (3):

$$v4=v3\times(1/\times1)\times q1,$$

wherein q1=mc/n3, v4 is a target rotating speed of the camera 101 about the second rotational axis. The third parameter target value (mc) input by the user can be a positive number or a negative number. When mc>0, and thereby q1>0, the camera 101 can be controlled to rotate clockwise in the vertical plane about the second rotational axis, thereby rotate upwards. When mc=0, the camera 101 can be held to still in the vertical plane. When mc<0, and thereby q1<0, the camera 101 can controlled to rotate counterclockwise in the vertical plane about the second rotational axis, thereby rotate downwards. In another embodiment, q1=(mc−mi)/n3, wherein mi is ½ of the third parameter maximum value.

By adjusting the rotating speed of the camera 101 through the platform 102 based on a substantially real-time obtained current zoom magnification of the camera 101, the images captured by the camera 101 can be clear and stable, with the zoom magnification in need.

The platform controller 103 can be logic gate array components, electronic components, or a central processing unit (CPU).

Figure 3:
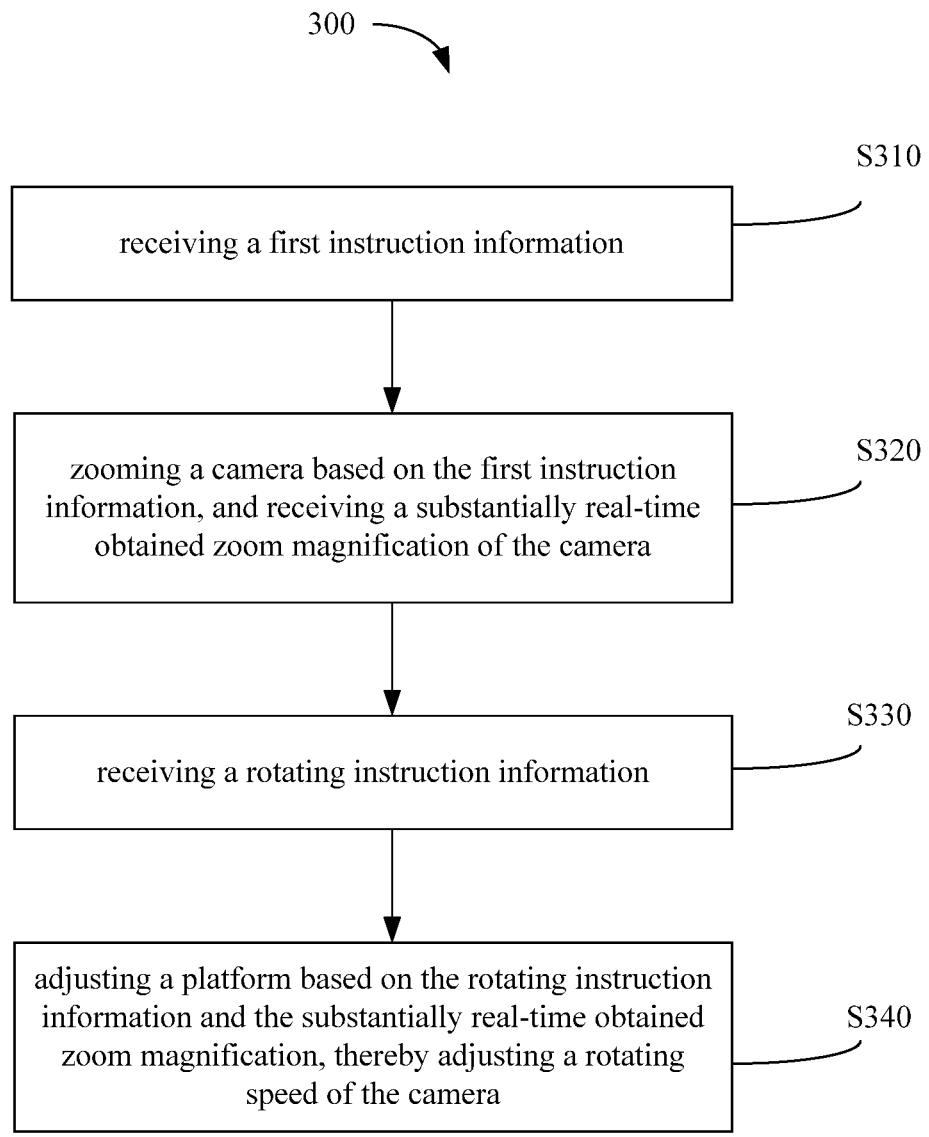
FIG. 3 is a flowchart of one embodiment of an image capturing method of the UAV.

Referring to FIG. 3, one embodiment of an image capturing method 300 of the UAV comprises steps:

S310, receiving a first instruction information;

S320, zooming the camera 101 based on the first instruction information, and obtaining the substantially real-time obtained current zoom magnification of the camera 101;

S330, receiving the rotating instruction information; and

S340, adjusting the platform 102 based on the rotating instruction information and the substantially real-time obtained zoom magnification, thereby adjusting the rotating speed of the camera 101.

The method 300 can be accomplished by the above mentioned image capturing system.

In step S310, the first instruction information can be received by the flight controller 104, and transmitted to the platform controller 103 from the flight controller 104.

In step S320, the camera 101 can be controlled to zoom and the current zoom magnification can be substantially real-time obtained by the platform controller 103.

In step S330, the rotating instruction information can be received by the flight controller 104, and transmitted to the platform controller 103 from the flight controller 104.

In step S340, the platform 102 can be adjusted by the platform controller 103.

In one embodiment, the method can further comprise a step of transmitting the first instruction information and the rotating instruction information from the remote controller to the UAV 100, such as to the flight controller 104 through the wireless communication between the remote controller 106 and the wireless communication device 105.

In one embodiment, the method can further comprise a step of obtaining the preset zoom magnification (w) from the camera 101, the first parameter shifting value (n1), and the second parameter shifting value (n2), and/or the third parameter shifting value (n3) from the remote controller 106.

In one embodiment, the step S320 can comprise zooming the camera 101 according to the calculating formula (1).

In one embodiment, the step S340 can comprise at least one step of step S342 and step S344, wherein S342, adjusting the rotating speed of the camera 101 about the first rotational axis according to the calculating formula (2); and S344, adjusting the rotating speed of the camera 101 about the second rotational axis according to the calculating formula (3).

In one embodiment, the method 300 can further comprise steps of: when nc>0, rotating the camera clockwise about the first rotational axis; when nc=0, holing the camera to still about the first rotational axis; and when nc<0, rotating the camera counterclockwise about the first rotational axis.

In one embodiment, the method 300 can further comprise steps of: when mc>0, rotating the camera clockwise about the second rotational axis; when mc=0, holding the camera still about the second rotational axis; when mc<0, rotating the camera counterclockwise about the second rotational axis.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image capturing system of an unmanned aerial vehicle, the image capturing system comprising:
    a camera;
    a platform carrying the camera; and
    a platform controller comprising a focus adjustment unit, the platform controller being configured to adjust a rotating speed of the camera through the platform based on rotating instruction information and a current zoom magnification of the camera, the current zoom magnification being obtained from the camera substantially in real-time, and the platform controller being further configured to obtain a first parameter shifting value from a remote controller and a maximum zoom magnification of the camera, the first parameter shifting value being a difference between a first parameter maximum value and a first parameter minimum value of the remote controller, the rotating instruction information containing a first parameter target value in a range between the first parameter maximum value and the first parameter minimum value, and the focus adjustment unit being configured to control the camera to zoom according to a first calculating formula:

$$x=(m1/n1)\times w,$$

wherein x is a target zoom magnification, n1 is the first parameter shifting value, m1 is the first parameter target value, and w is the maximum zoom magnification of the camera.

2. The image capturing system of claim 1, wherein the rotating instruction information comprises at least one of a second instruction information configured to adjust the rotating speed of the camera about a first rotational axis and a third instruction information configured to adjust the rotating speed of the camera about a second rotational axis.

3. The image capturing system of claim 2, wherein the first rotational axis is a yaw axis, and the second rotational axis is a pitch axis.

4. The image capturing system of claim 1, wherein the platform controller further comprises a speed adjustment unit; the focus adjustment unit is configured to control the camera to zoom based on a first instruction information, and to receive the current zoom magnification; and the speed adjustment unit is electrically connected to the focus adjustment unit and the platform, and configured to adjust the rotating speed of the camera.

5. The image capturing system of claim 1, wherein the rotating speed of the camera is adjusted to be inversely proportional to the current zoom magnification.

6. The image capturing system of claim 2, wherein the platform controller is further configured to obtain a maximum rotating speed about the first rotational axis of the platform, and a second parameter shifting value from the remote controller; the second parameter shifting value is a difference between a second parameter maximum value and a second parameter minimum value of the remote controller; the second instruction information contains a second parameter target value in a range between the second parameter maximum value and the second parameter minimum value; the platform controller further comprises a speed adjustment unit, and the speed adjustment unit is configured to adjust the rotating speed of the camera about the first rotational axis according to a second calculating formula:

$$v2=v1\times(1/x1)\times q,$$

wherein q=nc/n2, v2 is a target rotating speed of the camera about the first rotational axis, v1 is the maximum rotating speed, x1 is the current zoom magnification, nc is the second parameter target value, and n2 is the second parameter shifting value.

7. The image capturing system of claim 2, wherein the platform controller is further configured to obtain a maximum rotating speed about the second rotational axis of the platform, and a third parameter shifting value from a remote controller, the third parameter shifting value is a difference between a third parameter maximum value and a third parameter minimum value of the remote controller, the third instruction information contains a third parameter target value in a range between the third parameter maximum value and the third parameter minimum value, the platform controller further comprises a speed adjustment unit, and the speed adjustment unit is configured to adjust the rotating speed of the camera about the second rotational axis according to a third calculating formula:

$$v4=v3\times(1/x1)\times q1,$$

wherein q1=mc/n3, v4 is a target rotating speed of the camera about the second rotational axis, v3 is the maximum rotating speed, x1 is the current zoom magnification, mc is the third parameter target value, and n3 is the third parameter shifting value.

8. The image capturing system of claim 1, further comprising a flight controller and a wireless communication device, the flight controller is electrically connected to the wireless communication device to receive the rotating instruction information, and is electrically connected to the platform controller to transmit the rotating instruction information to the platform controller.

9. The image capturing system of claim 8, wherein the platform, the platform controller, the flight controller, and the wireless communication device are mounted on the unmanned aerial vehicle, the camera is mounted on the platform.

10. The image capturing system of claim 1 further comprising the remote controller and a displaying device; the remote controller is configured to transmit the rotating instruction information to the unmanned aerial vehicle through a wireless communication.

11. An image capturing method of an unmanned aerial vehicle, the method comprising:
receiving a first instruction information and a rotating instruction information;
zooming a camera based on the first instruction information, and obtaining a current zoom magnification of the camera, the current zoom magnification being substantially real-time obtained from the camera; and
adjusting a rotating speed of the camera through a platform, wherein the camera is carried by the platform, based on the rotating instruction information and the current zoom magnification;
wherein the first instruction information contains a first parameter target value, and the zooming the camera based on the first instruction information further comprises:
zooming the camera according to a first calculating formula:

$$x=(m1/n1)\times w,$$

wherein x is a target zoom magnification, n1 is a first parameter shifting value, m1 is the first parameter target value, and w is a maximum zoom magnification of the camera, the first parameter shifting value is a difference between a first parameter maximum value and a first parameter minimum value of a remote controller, the first parameter target value is in a range between the first parameter maximum value and the first parameter minimum value.

12. The method of claim 11, wherein the first instruction information and the rotating instruction information are received from the remote controller by the unmanned aerial vehicle through a wireless communication.

13. The method of claim 11, wherein the current zoom magnification of the camera is obtained by a platform controller, and the rotating speed of the camera is adjusted by the platform controller.

14. The method of claim 11, wherein the adjusting the rotating speed of the camera comprises:
adjusting the rotating speed of the camera to be inversely proportional to the current zoom magnification.

15. The method of claim 11, wherein the rotating instruction information contains a second parameter target value, and the adjusting the rotating speed of the camera comprises:
adjusting the rotating speed of the camera about a first rotational axis according to a second calculating formula:

$$v2=v1\times(1/x1)\times q,$$

wherein q=nc/n2, v2 is a target rotating speed of the camera about the first rotational axis, v1 is a maximum rotating speed about a first rotational axis of the platform, x1 is the current zoom magnification, nc is the second parameter target value, and n2 is a second parameter shifting value, the second parameter shifting value is a difference between a second parameter maximum value and a second parameter minimum value of the remote controller, the second parameter target value is in a range between the second parameter maximum value and the second parameter minimum value.

16. The method of claim 15, further comprising:
when nc>0, rotating the camera clockwise about the first rotational axis;
when nc=0, holding the camera still at about the first rotational axis;
when nc<0, rotating the camera counterclockwise about the first rotational axis.

17. The method of claim 11, wherein the rotating instruction information contains a third parameter target value, and the adjusting the rotating speed of the camera comprises:
adjusting the rotating speed of the camera about a second rotational axis according to a third calculating formula:

$$v4=v3\times(1/x1)\times q1,$$

wherein q1=mc/n3, v4 is a target rotating speed of the camera about the second rotational axis, v3 is a maximum rotating speed about a second rotational axis of the platform, x1 is the current zoom magnification, mc is the third parameter target value, and n3 is a third parameter shifting value, the third parameter shifting value is a difference between a third parameter maximum value and a third parameter minimum value of the remote controller, the third parameter target value is in a range between the third parameter maximum value and the third parameter minimum value.

18. The method of claim 17, further comprising:
when mc>0, rotating the camera upwards;
when mc=0, holding the camera still at about the second rotational axis;
when mc<0, rotating the camera downwards.

* * * * *